April 8, 1930.  C. B. FOWLER  1,754,014
INDICATOR FOR PARKING ROAD VEHICLES
Filed April 21, 1928
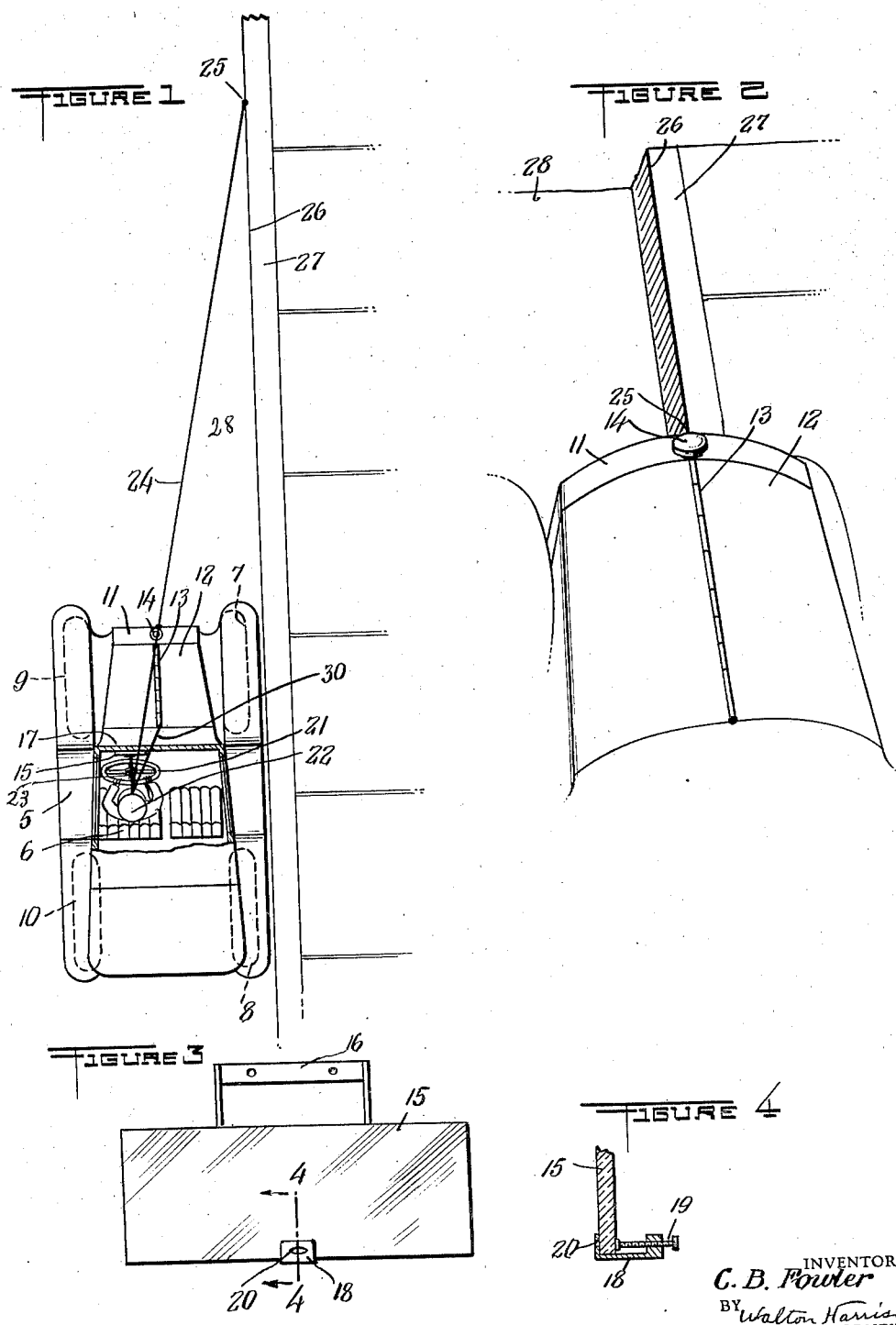
INVENTOR
C. B. Fowler
BY Walton Harrison
ATTORNEY Patented Apr. 8, 1930

1,754,014

UNITED STATES PATENT OFFICE

CLARENCE BERNARD FOWLER, OF QUEENS VILLAGE, NEW YORK

INDICATOR FOR PARKING ROAD VEHICLES

Application filed April 21, 1928. Serial No. 271,751.

My invention relates to indicators for use in parking road vehicles near the curb.

More particularly stated my invention relates to means for enabling the chauffeur, without leaving his seat back of the steering-wheel, to determine practically at a glance the general position occupied by the vehicle relatively to the curb; thus prompting him to execute such movement or movements as may be necessary to park the vehicle in proper spacial relation relatively to the curb.

In this connection it should be borne in mind that as a rule in communities where there are strict requirements as to the parking of road vehicles near the curb, the curb nearly always extends about eight inches above the adjacent surface of the roadbed, and presents an angular surface easy to be seen in perspective, by the chauffeur seated as usual and looking obliquely downward at the curb, a few feet ahead of the vehicles.

Under the police parking regulations in most communities, the parking distance from the curb is four inches; that is, chauffeurs in parking their vehicles alongside of a curb are required to locate the vehicle in such position that the road wheels adjacent the curb are spaced from the curb by not more than four inches.

Sometimes, however, the chauffeur experiences difficulty in locating his vehicle in the precise position required without abrading the tires against the curbstone. The reason is that with the chauffeur seated back of the steering-wheel and his hands upon the latter he is not in position to see the road wheels of his vehicle, or even to see the curb at any point immediately adjacent said wheels. However, by looking obliquely downward and toward the curb he sees the curb in perspective, extending continuously ahead, his view of the curb beginning alongside or a little ahead of the vehicle, and extending forwardly.

By my invention I seek to enable the chauffeur to utilize, to the best possible advantage, the limited field of view available to him as just described, in order to properly park his vehicle at the regulation distance from the curb.

In the practical use of my invention the chauffeur at the start selects a predetermined fixed portion of the vehicle body, preferably the hinge line of the motor hood, as a basis of reckoning; and I provide means whereby he can at any moment bring his head into a predetermined exact position, relatively to the car body, so that said hinge line always appears in perspective and always presents the same appearance, and so that whenever the vehicle is in an ideal position for parking near the curb, the nearest portion of the curb visible to the chauffeur appears to him in perspective and to be in alignment with said hinge line.

Reference is made to the accompanying drawing forming a part of this specification, and in which like reference characters indicate like parts throughout the figures.

Figure 1 is a plan view of a road vehicle parked in a conventional position relatively to a curb, and indicates generally the manner in which my device is used.

Figure 2 is a fragmentary perspective, showing the edge of the curb in its relation to a certain fixed part of the vehicle body, as seen in perspective by the chauffeur as he uses my invention as herein described.

Figure 3 is an elevation of a rear-view mirror carried by the vehicle, for enabling the operator, by looking into the mirror to bring his head into a predetermined exact location relative to the vehicle body suitable for obtaining an advantageous perspective of the curb.

Figure 4 is a section on the line 4—4 of Figure 3, looking in the direction indicated by the arrows.

The vehicle body appears at 5, and is provided with a chauffeur's seat 6 and with road wheels 7, 8, 9 and 10.

The vehicle carries a radiator 11 and a hood 12, the hood having a hinge line 13, located as usual.

Mounted centrally upon the radiator 11 and extending upwardly therefrom is a removable cap 14. Instead of this cap there may be substituted a figure, or an ornament, as well known in the art.

A rear-view mirror is shown at 15, and is supported in position upon a bracket 16, supported by the framework 17 around the windshield.

Carried by the mirror 15 is a blinder plate 18, preferably formed into a clamp as indicated in Figure 4, and provided with a screw 19. The blinder plate is provided with a peep hole 20, through which a small portion of the mirror is visible.

The operator by loosening the screw 19 can adjust the blinder plate into a predetermined normal position relatively to the mirror, and by tightening the screw 19 the blinder plate may be kept in said position.

A steering-wheel 21 is located immediately in front of the seat 6. The chauffeur is shown at 22, and as occupying the seat 6. He has his hands upon the steering-wheel 21, and is sitting in his normal position as when driving the vehicle.

The blinder plate 18 is so adjusted as above described that the chauffeur, seated as indicated in Figure 1 can, by a slight movement of his head if any movement be necessary, bring one of his eyes, for example his right eye, directly into alignment with the peep hole 20. He does this easily, and almost naturally and instinctively, by looking into the peep hole and locating therein the image of his right eye. This done, and without displacing his head laterally he glances obliquely downward with both eyes. His field of view is now a perspective. He sees the hinge line 13 throughout its entire length. He also sees a portion of the curb, the extent and apparent location of the same being dependent upon the position of the vehicle relatively to the curb. With the vehicle in ideal parking position relatively to the curb, as indicated in Figure 1, the chauffeur sees, apparently in alignment with the hinge line, and extending continuously ahead therefrom, the upper edge 26 of the curb 27.

Thus the hinge line 13 serves the purpose of a linear target, used by the chauffeur as a basis of reckoning.

With the vehicle properly parked as shown in Figure 1, namely with its road wheels 7 and 8 each approximately four inches from the curb 27, the chauffeur has a field of view substantially like that shown in Figure 2, the curb line 26 apparently merging with the hinge line 13, and extending forwardly therefrom an indefinite distance.

The principle may perhaps be rendered clearer by a study of the collimation lines 24 and 30 shown in Figure 1.

The collimation line 24 extends from the chauffeur's eyes to a point 25, on the curb line 26, and grazes the front end of the hinge line 13. The collimation line 30 extends from the chauffeur's eyes to the rear end of the hinge line. Between the lines 24 and 30 the chauffeur sees all of the hinge line. Beginning at the point 25 and extending an indefinite distance forwardly therefrom, the chauffeur sees the curb line 26.

If, however, the vehicle occupies any other position relatively to the curb 27 and roadbed 28, the curb 27 will not appear as shown in Figure 2, but will be displaced accordingly.

It is necessary when installing the indicator, that with the vehicle properly parked alongside the curb, the blinder plate 18 be adjusted into position to give the visual indications above described.

As a general rule, if the vehicle be an automobile of ordinary construction, and is being driven closely alongside the curb, the hinge line 13 will appear to be substantially in alignment with the edge of the curb 27 as above described. In most hoods used upon automobiles, the hinge line slopes slightly downward toward the front. Since, however, the hinge line is seen in perspective, the hinge line and the curb line will appear in practice to merge into a single continuous line, which is straight or almost straight.

The chauffeur, after once obtaining his reckoning in the manner above described and after a little practice, can determine with great accuracy when his car or other road vehicle is in position, relatively to the curb, to be properly parked.

If in moving the vehicle backward and forward the vehicle stops in any such position that the hinge line 13 and the curb line 26 appear much different from the way they do in Figure 2, the chauffeur knows that the vehicle is in the wrong position for parking; and with a little practice, this data gives him a prompting as to what he should do to correct the position.

It will be noted that lines 24 and 30, shown in Figure 1 as grazing the hinge line 13 of the hood 12, are essentially lines of collimation; and that these lines give the chauffeur a ready indication as to the position of the vehicle wheels relatively to the curb.

It should also be noted that in practice a chauffeur, in driving a road vehicle such as an automobile, finds it desirable to have great freedom of movement for his arms and head, and that his vision should be obstructed as little as possible. Owing to these considerations, it is not practicable for him to have in front of his face or touching the back of his head any sort of mechanical guide, such as might otherwise enable him to establish lines of collimation for the purposes above indicated.

By means of my invention, however, the chauffeur can have unobstructed freedom of movement and an unobscured field of vision, at all times, and yet upon a moment's notice he can calibrate the position of his car relatively to the curb. In doing this he does not see either the wheels of his car or the portion of the curb immediately adjacent thereto.

Having thus described my invention what

I claim as new and desire to secure by Letters Patent is as follows:—

1. In an indicator for alining road vehicles a predetermined distance from the edge of a road the combination, with a vehicle body carrying a sighting object located in a fixed position relatively thereto, and also carrying a mirror, of a blinder plate disposed adjacent said mirror and provided with a peep hole for indicating to the operator when his head is brought into a predetermined exact position relatively to said vehicle body and to said sighting object, in order to enable the operator to glance along a definite collimation line grazing said sighting object.

2. In an indicator for alining road vehicles a predetermined distance from the edge of a road the combination, with a vehicle body carrying a linear target fixed relatively thereto and also carrying a mirror, of mechanism connected with said mirror, and adjustable relatively thereto for indicating to the operator when one of his eyes is brought into a predetermined exact position relatively to said vehicle body and to said linear target, so as to enable the operator to glance substantially along a collimation line extending from his eye in said exact position and past said linear target to a stationary object adjacent the roadbed.

Signed at New York city, in the county of New York and State of New York, this 19th day of April, 1928.

CLARENCE BERNARD FOWLER.